US007945570B2

(12) United States Patent
Papadimitriou et al.

(10) Patent No.: US 7,945,570 B2
(45) Date of Patent: May 17, 2011

(54) IDENTIFYING OPTIMAL MULTI-SCALE PATTERNS IN TIME-SERIES STREAMS

(75) Inventors: Spyridon Papadimitriou, White Plains, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/551,033

(22) Filed: Aug. 31, 2009

(65) Prior Publication Data
US 2010/0063974 A1 Mar. 11, 2010

Related U.S. Application Data

(63) Continuation of application No. 11/471,002, filed on Jun. 20, 2006, now abandoned.

(51) Int. Cl.
G06F 17/30 (2006.01)
(52) U.S. Cl. ..................................................... 707/746
(58) Field of Classification Search .................. None
See application file for complete search history.

(56) References Cited

U.S. PATENT DOCUMENTS

| 6,115,708 | A | 9/2000 | Fayyad et al. ..................... 707/6 |
| 7,203,382 | B2 | 4/2007 | Mattausch et al. ............. 382/305 |
| 2003/0229636 | A1 | 12/2003 | Mattausch et al. ................ 707/6 |
| 2004/0103095 | A1 | 5/2004 | Matsugu et al. ................... 707/6 |
| 2004/0254930 | A1 | 12/2004 | Acharya ........................... 707/6 |

OTHER PUBLICATIONS

Li, Tao et al., "A survey on wavelet applications in data mining," Dec. 2002, ACM SIGKDD Explorations Newsletter, vol. 4, Issue 2, pp. 49-68.*
Li, Tao, et al., "A Survey on Wavelet Applications in Data Mining," 2002, ACM SIGKDD '02, vol. 4, issue 2, pp. 49-68.*
Zhao, Xiaojian, et al., "Incremental Method for Simple Problems in Time Series: algorithms and experiments," 2005, IEEE, Proceedings of the 9th International Database Engineering & Application Symposium (IDEAS '05), pp. 1-12.*
Megalooikonomou, V., et al., "A multi-resolution symbolic representation of time series," Apr. 5-8, 2005, Proceedings of the 21st International Conference on Data Engineering (ICDE '05), pp. 668-679.*

* cited by examiner

*Primary Examiner* — Neveen Abel-Jalil
*Assistant Examiner* — Farhan M Syed
(74) *Attorney, Agent, or Firm* — Jon A. Gibbons; Fleit Gibbons Gutman Bongini & Bianco PL

(57) ABSTRACT

A computer-implemented method, system, and a computer readable article of manufacture identify local patterns in at least one time series data stream. A data stream is received that comprises at least one set of time series data. The at least one set of time series data is formed into a set of multiple ordered levels of time series data. Multiple ordered levels of hierarchical approximation functions are generated directly from the multiple ordered levels of time series data. A set of approximating functions are created for each level. A current window with a current window length is selected from a set of varying window lengths. The set of approximating functions created at one level in the multiple ordered levels is passed to a subsequent level as a set of time series data. The multiple ordered levels of hierarchical approximation functions are stored into memory after being generated.

18 Claims, 8 Drawing Sheets ns of time series data streams. In VLDB, 2002; T. Palpanas, M. Vlachos, E. J. Keogh, D. Gunopulos, and W. Truppel. Online amnesic approximation of streaming time series. In ICDE, 2004; S. Papadimitriou, A. Brockwell, and C. Faloutsos. Adaptive, unsupervised stream mining. VLDB J., 13(3), 2004; M. Vlachos, C. Meek, Z. Vagena, and D. Gunopulos. Identifying similarities, period-

IDENTIFYING OPTIMAL MULTI-SCALE PATTERNS IN TIME-SERIES STREAMS

CROSS-REFERENCE TO RELATED APPLICATIONS

This continuation application is based upon and claims priority from prior U.S. patent application Ser. No. 11/471,002, filed on Jun. 20, 2006, now abandoned, the entire disclosure of which is herein incorporated by reference in its entirety.

STATEMENT REGARDING FEDERALLY SPONSORED RESEARCH OR DEVELOPMENT

This invention was made with Government support under Contract No.: H98230-05-3-0001 awarded by Intelligence Agencies. The Government has certain rights in this invention.

FIELD OF THE INVENTION

The present invention generally relates to the field of stream processing systems, and more particularly relates to identifying optimal local patterns in a data stream time series.

BACKGROUND OF THE INVENTION

Data streams have recently received much attention in several communities (e.g., theory, databases, networks, data mining) because of several important applications (e.g., network traffic analysis, moving object tracking, financial data analysis, sensor monitoring, environmental monitoring, scientific data processing). Many recent efforts concentrate on summarization and pattern discovery in time series data streams. Some of these recent efforts are further described in (Y. Chen, G. Dong, J. Han, B. W. Wah, and J. Wang. Multi-dimensional regression analysis of time-series data streams. In VLDB, 2002; T. Palpanas, M. Vlachos, E. J. Keogh, D. Gunopulos, and W. Truppel. Online amnesic approximation of streaming time series. In ICDE, 2004; S. Papadimitriou, A. Brockwell, and C. Faloutsos. Adaptive, unsupervised stream mining. VLDB J., 13(3), 2004; M. Vlachos, C. Meek, Z. Vagena, and D. Gunopulos. Identifying similarities, periodicities and bursts for online search queries. In SIGMOD, 2004; K. Chakrabarti, E. Keogh, S. Mehotra, and M. Pazzani. Locally adaptive dimensionality reduction for indexing large time series databases. TODS, 27(2), 2002; P. Patel, E. Keogh, J. Lin, and S. Lonardi. Mining motifs in massive time series databases. In ICDM, 2002; B. Chiu, E. Keogh, and S. Lonardi. Probabilistic discovery of time series motifs. In KDD, 2003).

Typical approaches for pattern discovery and summarization of time series rely on fixed transforms, with a predetermined set of bases or approximating functions, as described in (S. Papadimitriou, A. Brockwell, and C. Faloutsos. Adaptive, unsupervised stream mining. VLDB J., 13(3), 2004; M. Vlachos, C. Meek, Z. Vagena, and D. Gunopulos. Identifying similarities, periodicities and bursts for online search queries. In SIGMOD, 2004, Y. Chen, G. Dong, J. Han, B. W. Wah, and J. Wang. Multi-dimensional regression analysis of time-series data streams. In VLDB, 2002; T. Palpanas, M. Vlachos, E. J. Keogh, D. Gunopulos, and W. Truppel. Online amnesic approximation of streaming time series. In ICDE, 2004, and K. Chakrabarti, E. Keogh, S. Mehotra, and M. Pazzani. Locally adaptive dimensionality reduction for indexing large time series databases. TODS, 27(2), 2002). For example, the short-window Fourier transform uses translated sine waves of fixed length, and has been successful in speech processing, as is further described in (M. R. Portnoff. Short-time Fourier analysis of sampled speech. IEEE Trans. ASSP, 29(3), 1981). Wavelets use translated and dilated sine-like waves and have been successfully applied to more bursty data, such as images and video streams However, these approaches assume a fixed-length, sliding window. For example, short-window Fourier cannot reveal anything about periods larger than the sliding window length. Wavelets are by nature multi-scale, but they still use a fixed set of bases, which is also often hard to choose.

In time series stream methods, the work described in "A multiresolution symbolic representation of time series" by Megalooikonomou, Wang, Li, and Faloutsos, in ICDE 2005: 668-679 produces a single representative for a set of scales, using vector quantization within each scale. Its main focus is on finding good-quality and intuitive distance measures for indexing and similarity search. However, this approach does not produce a window size. The window sizes are chosen a priori. Also, this approach it is not applicable to streams, it is severely restricted in the type of approximation (each window is approximated by a discrete value, based on the vector quantization output) and hence the method cannot be composed so the next level reuses the approximations of the previous level.

The work described in "A data compression technique for sensor networks with dynamic bandwidth allocation" by Lin, Gunopulos, Kalogeraki, and Lonardi, in TIME 2005: 186-188 also uses vector quantization in order to reduce power consumption for wireless sensor networks. This approach only examines a single, a priori chosen window size.

The work in "Knowledge discovery from heterogeneous dynamic systems using change-point correlations" by Idé and Inoue, in SDM 2005: 571-576) employs a similar technique for change point detection. The change point scores are then used to correlate complex time series. This approach examines only a single, a priori chosen window size, and the computation required is too costly to be feasible in a streaming environment.

Therefore a need exists to overcome the problems with the prior art as discussed above.

SUMMARY OF THE INVENTION

In one embodiment, implemented method for identifying local patterns in at least one time series data stream is disclosed. The method includes receiving a data stream is received that comprises at least one set of time series data. The at least one set of time series data is formed into a set of multiple ordered levels of time series data. Multiple ordered levels of hierarchical approximation functions are generated directly from the multiple ordered levels of time series data. The hierarchical approximation functions for each level of the multiple ordered levels is based upon: creating a set of approximating functions for each level in the multiple ordered levels; selecting a current window with a current window length from a set of varying window lengths, wherein the current window is selected for a current level of the multiple ordered levels; and passing the set of approximating functions created at one level in the multiple ordered levels to a subsequent level in the multiple ordered levels as a set of time series data. The multiple ordered levels of hierarchical approximation functions are stored into memory after being generated.

In another embodiment, a system for identifying local patterns in at least one time series data stream is disclosed. The system includes at least one information processing system.

The at lest one information processing system a memory and a data stream analyzer communicatively coupled to the memory. The data stream analyzer receives a data stream is received that comprises at least one set of time series data. The at least one set of time series data is formed into a set of multiple ordered levels of time series data. Multiple ordered levels of hierarchical approximation functions are generated directly from the multiple ordered levels of time series data. The hierarchical approximation functions for each level of the multiple ordered levels is based upon: creating a set of approximating functions for each level in the multiple ordered levels; selecting a current window with a current window length from a set of varying window lengths, wherein the current window is selected for a current level of the multiple ordered levels; and passing the set of approximating functions created at one level in the multiple ordered levels to a subsequent level in the multiple ordered levels as a set of time series data. The multiple ordered levels of hierarchical approximation functions are stored into memory after being generated.

In another embodiment, a computer implemented method for identifying local patterns in at least one time series data stream is disclosed. The method comprises generating multiple ordered levels of hierarchical approximation functions directly from at least one given time series data stream including at least one set of time series data. The hierarchical approximation functions for each level of the multiple ordered levels is based upon creating a set of approximating functions and selecting a current window with a current window length from a set of varying window lengths. The current window is selected for a current level of the multiple ordered levels. The generation of multiple ordered levels of hierarchical approximation functions includes generating multiple increasing consecutive numerically ordered levels. The current window is a portion of the set of time series data divided into consecutive sub-sequences. The current window length along with the hierarchical approximating functions reduces an approximation error between the current window and the set of time series data portion.

One advantage of the present invention is that an optimal orthonormal transform is determined from data itself, as opposed to using a predetermined basis or approximating function (such as piecewise constant, short-window Fourier or wavelets). Another advantage of the present invention is that it provides a hierarchical, recursive summarization or approximation of the stream that examines the time series at multiple time scales (i.e., window sizes) and efficiently discovers the key patterns in each, as well as the key windows. Besides providing insight about the behavior of the time series by concisely describing the main trends in a time series, the discovered patterns can also be used to facilitate further data processing.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
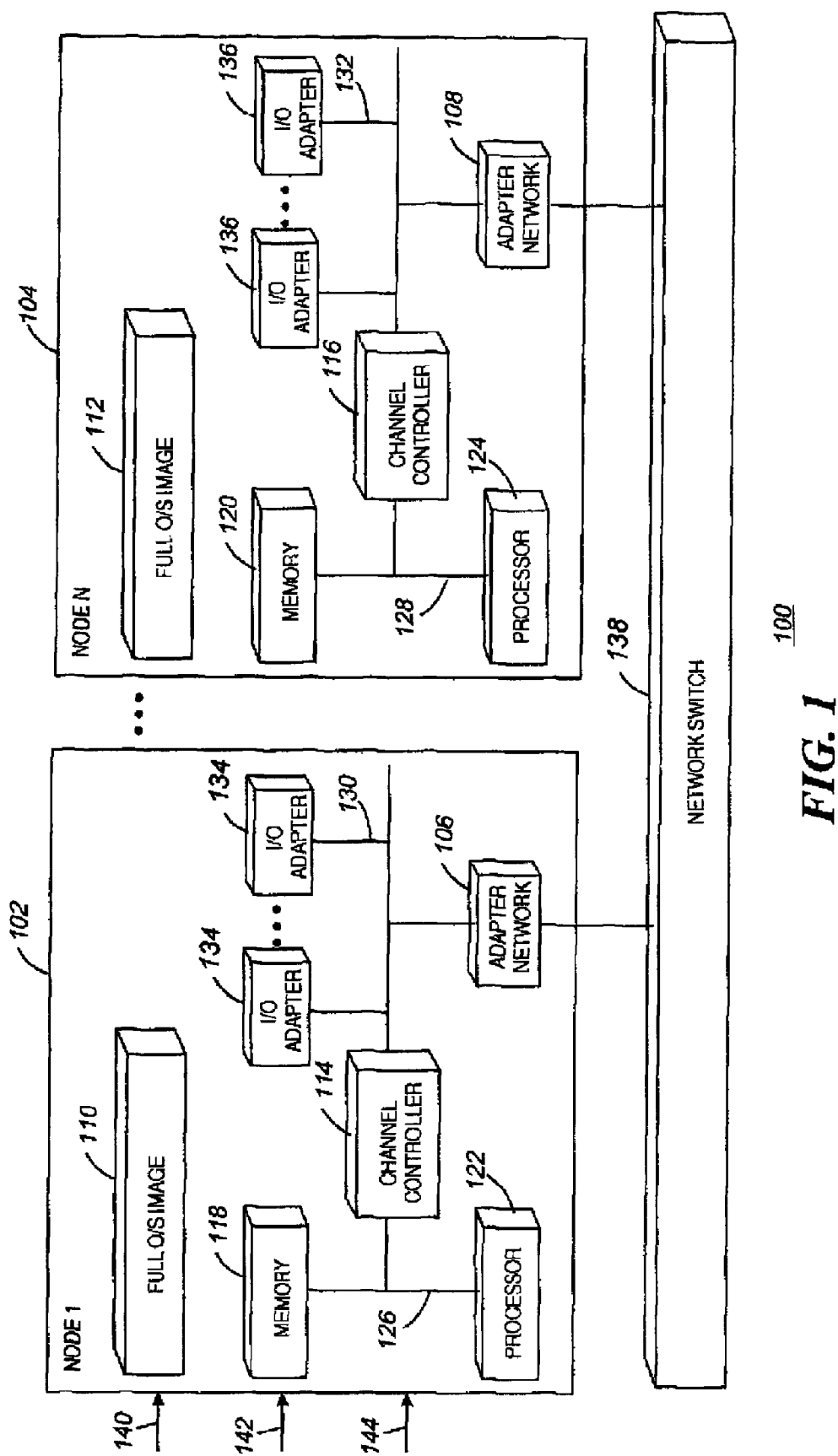
FIG. 1 is a diagram illustrating an exemplary stream processing system, according to an embodiment of the present invention.

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information. The present invention, according to an embodiment, overcomes problems with the prior art by providing a more efficient mechanism for memory copy operations. The present invention allows the processor to continue executing subsequent instructions during a memory copy operation thereby avoiding unnecessary processor downtime.

Exemplary Stream Processing System

According to an embodiment of the present invention, as shown in FIG. 1, an exemplary stream processing system 100 is shown. The stream processing system 100, in one embodiment determines optimal local patterns that describe the main trends in a time series data stream. The stream processing system 100, in one embodiment, examines the time series at multiple scales (i.e. window sizes) and efficiently discovers the key patterns in each. The stream processing system 100 also selects a window size out of a set of window sizes that most concisely captures the key oscillatory as well as aperiodic trends. In one embodiment, the stream processing system 100 is a distributed system that can operate in an SMP computing environment. It should be noted that the present invention is not limited to a distributed processing system and it is within the true scope and spirit of the invention to be implemented on other processing architectures.

The stream processing system 100, in one embodiment, includes data streams 140, 142, 144, which in one embodiment, are time series data streams comprising one or more sets of time series data. The stream processing system 100 can execute on a plurality of processing nodes 102, 104 coupled to one another node via a plurality of network adapters 106, 108. Each processing node 102, 104 is an independent computer with its own operating system image 110, 112, channel controller 114, 116, memory 118, 120, and processor(s) 122, 124 on a system memory bus 126, 128. A system input/output bus 130, 132 couples I/O adapters 134, 136 and network adapter 106, 108. Although only one processor 122, 124 is shown in each processing node 102, 104, each processing node 102, 104 is capable of having more than one processor. Each network adapter is linked together via a network switch 138. In some embodiments, the various processing nodes 102, 104 are able to be part of a processing cluster. All of these variations are considered a part of the claimed invention.

Exemplary Information Processing System

Figure 2:
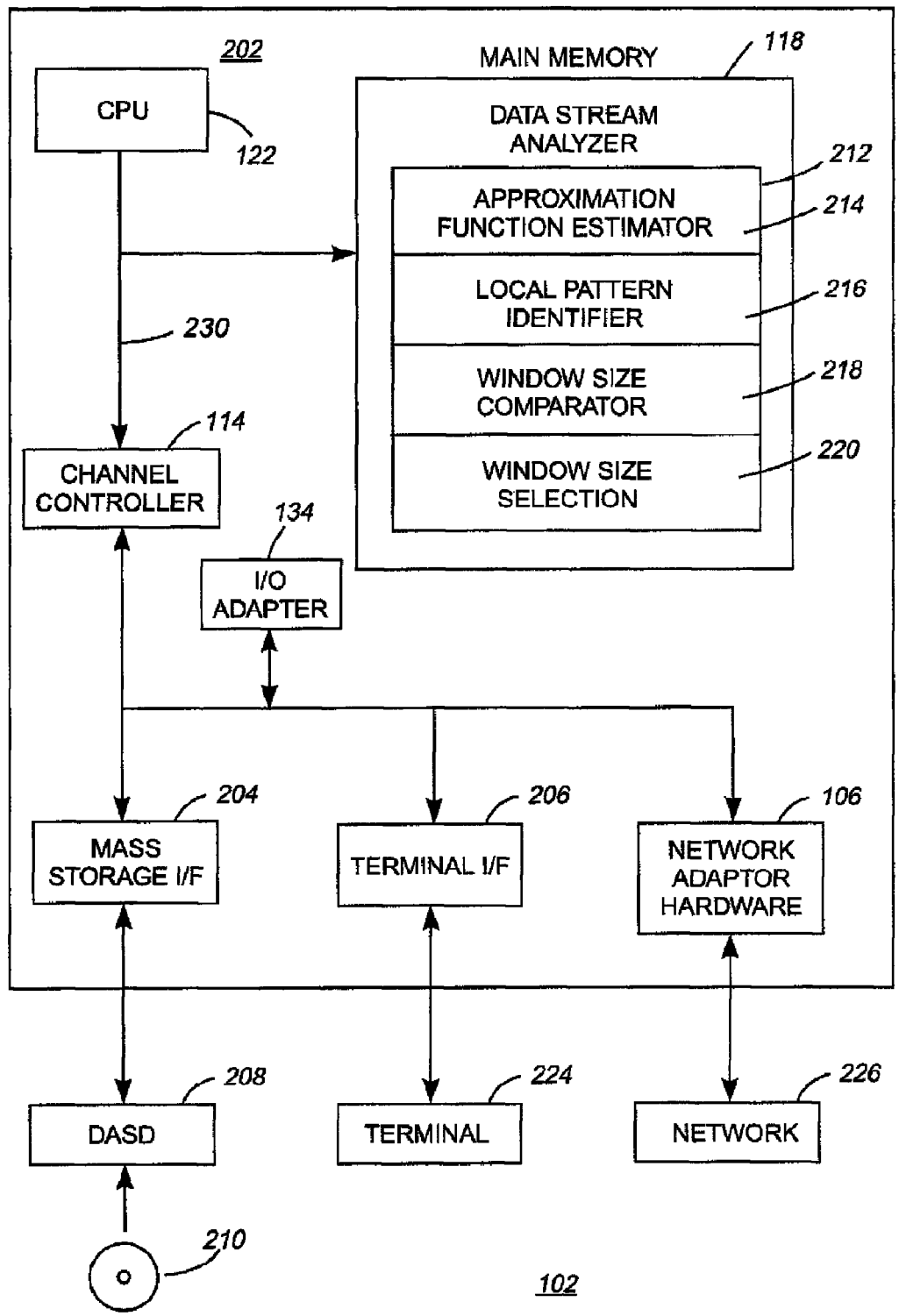
FIG. 2 is a diagram illustrating a more detailed view of an information processing system, according to an embodiment of the present invention.

FIG. 2 is a block diagram illustrating a more detailed view of the information processing system 102, according to the present invention. Although the following discussion is with respect to the processing node 102, it is likewise applicable to the other processing nodes 104 in FIG. 1. The information processing system 102 is based upon a suitably configured processing system adapted to implement the exemplary embodiment of the present invention. Any suitably configured processing system is similarly able to be used as the information processing system 102 by embodiments of the present invention, for example, a personal computer, workstation, or the like. The information processing system 102 includes a computer 202. The computer 202 has a processor 122 that is connected to the main memory 118 and the channel controller 114 via the system bus 230. The computer 202 also includes a mass storage interface 204, terminal interface 206, I/O adapter 134, and network adapter hardware 106. The mass storage interface 204 is used to connect mass storage devices, such as data storage device 208, to the information processing system 102 system. One specific type of data storage device is a computer readable medium such as a CD drive, which may be used to store data to and read data from a CD or DVD 210 or floppy diskette CD (not shown). Another type of data storage device is a data storage device configured to support, for example, NTFS type file system operations.

The main memory 118 comprises a data stream analyzer 212 for determining optimal local patterns which describe the main trends in a time series data stream 140, 142, 144. The data stream analyzer 212, in one embodiment, includes an approximation function estimator 214. The approximation function estimator 214, in one embodiment, determines appropriate approximating functions directly from data in a data stream. This process is discussed in greater detail below.

In one embodiment, the data stream analyzer 212 implements a hierarchical, recursive summarization or approximation of a data stream 140, 142, 144 that examines the time series at multiple time scales (i.e., window sizes) and efficiently discovers the key patterns in each via a local pattern identifier 216, as well as the key windows via a window size comparator 218 and a window size selector 220. The local pattern identifier 216, in one embodiment, identifies locally optimal patterns within each window and the window size comparator 218, in one embodiment, comparator the information captured by each of these patterns across various windows sizes.

The window size selector 220 then selects the optimal window sizes that most concisely capture the key oscillatory as well as periodic trends based on the window size comparison. The selection of the appropriate window sizes and approximating function can be performed across levels (i.e., not only within levels). The processes performed by the data stream analyzer 212 and each of its components are discussed in greater detail below. Besides providing insight about the behavior of the time series by concisely describing the main trends in a time series, the discovered patterns can also be used to facilitate further data processing. The data stream analyzer 212 can also perform fast, incremental estimation in a streaming setting.

Although illustrated as concurrently resident in the main memory 118, it is clear that respective components of the main memory 118 are not required to be completely resident in the main memory 118 at all times or even at the same time. In one embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 118 and data storage device 208. Note that the term "computer system memory" is used herein to generically refer to the entire virtual memory of the information processing system 102.

Although only one CPU 122 is illustrated for computer 202, computer systems with multiple CPUs can be used equally effectively. Embodiments of the present invention further incorporate interfaces that each includes separate, fully programmed microprocessors that are used to off-load processing from the CPU 122. Terminal interface 206 is used to directly connect one or more terminals 224 to computer 202 to provide a user interface to the computer 202. These terminals 224, which are able to be non-intelligent or fully programmable workstations, are used to allow system administrators and users to communicate with the information processing system 102. The terminal 224 is also able to consist of user interface and peripheral devices that are connected to computer 202 and controlled by terminal interface hardware included in the terminal I/F 206 that includes video adapters and interfaces for keyboards, pointing devices, and the like.

An operating system (not shown) included in the main memory is a suitable multitasking operating system such as the Linux, UNIX, Windows XP, and Windows Server 2001 operating system. Embodiments of the present invention are able to use any other suitable operating system. Some embodiments of the present invention utilize architectures, such as an object oriented framework mechanism, that allows instructions of the components of operating system (not shown) to be executed on any processor located within the processing node 102. The network adapter hardware 206 is used to provide an interface to a network 226. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. CD 210 and its equivalents, floppy disk (not shown), or other form of recordable media, or via any type of electronic transmission mechanism.

Exemplary Notation to be Used Throughout the Following Discussion

Figure 3:
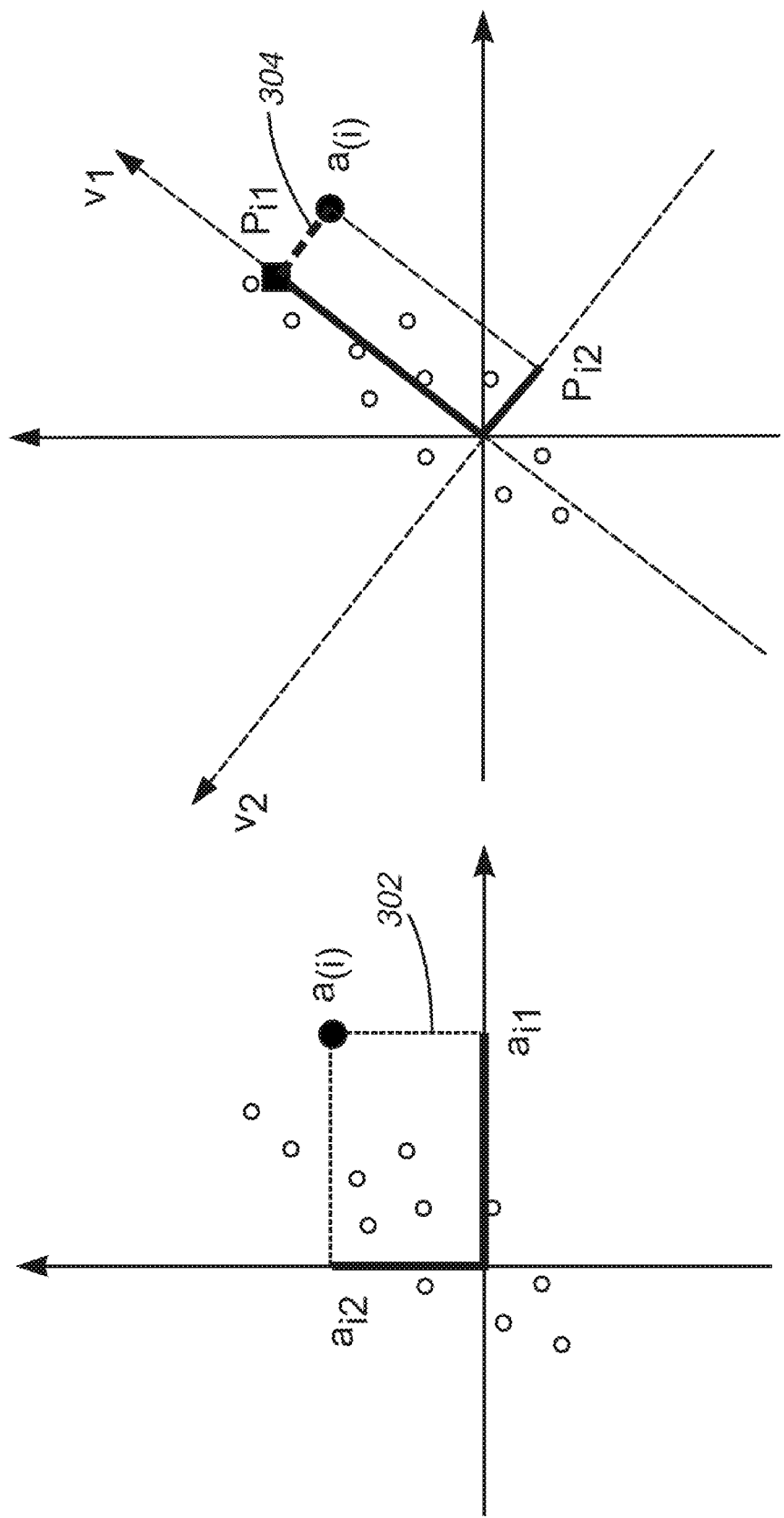
FIG. 3 is an exemplary x-y graph illustrating singular value decomposition, according to an embodiment of the present invention.

Throughout the following discussion boldface lowercase letters are used for column vectors, $v \equiv [v_1 v_2 \ldots v_n]^T \in R^n$, and boldface capital letters for matrices, $A_c R^{m \times n}$. The notation $a_{(i)}$ is adopted for the columns $A \equiv [a_1 a_2 \ldots a_3]$ and $a_{(i)}$ is adopted for the rows of $A \equiv [a_{(1)} a_{(2)} \ldots a_m]^T$. Note that $a_{(i)}$ are also column vectors, not row vectors. Throughout this discussion, vectors are represented as column vectors. For matrix/vector elements, subscripts, $a_{(i,j)}$, or brackets, a[i,j] are used. The rows of A are points in an (at most) n-dimensional space, $a_{(i)} \in R^n$ which is the row space of A. A "special" orthonormal basis for the row space can be found that defines a new coordinate system as shown in FIG. 3. For example, FIG. 3 illustrates singular value decomposition ("SVD") (for dimension n=2), with respect to row space. Each point in FIG. 3 corresponds to a row of the matrix A and $v_j$, j=1, 2 are the left singular vectors of A. The square is the one dimensional approximation of $a_{(i)}$ by projecting it onto the first singular vector.

If $v_j$ is a unit-length vector defining one of the axes in the row space, then for each row $a_{(i)}$, it's j-th coordinate in the new axes is the dot product $a_{(i)}^T v_j =: p_{ij}$ so that, if $V := [v_1 \ldots v_r]$ and we define P:=AV, then each row of P is the same point as the corresponding row of A but with respect to the new coordinate system. Therefore, lengths and distances are preserved, i.e.

$$\|a_{(i)}\| = \|p_{(i)}\| \text{ and } \|a_{(i)} - a_{(j)}\| = \|p_{(i)} - p_{(j)}\|, \text{ for all } 1 \leq i, j \leq m.$$

However, the new coordinate system is "special" in the following sense. If only the first k columns of P (e.g. a matrix named $\check{P}$ thus effectively projecting each point into a space with lower dimension k. Also, rows of the matrix $\tilde{A} := \check{P} \tilde{V}^T$ (EQ 1) are the same points translated back into the original coordinate system of the row space, e.g. the square 302 in FIG. 3 if k=1), where $\tilde{v}$ comprises the first k columns of V. Then $\check{P}$. maximizes the sum of squares $\|\check{P}\|_F^2 = \Sigma_{i,j=1}^{m,k} p_{ij}^{-2}$ or, equivalently, minimizes the sum of squared residual distances (e.g. the thick dotted 304 line in FIG. 3, if k=1), $$\|X - \tilde{X}\|_F^2 = \Sigma_{i=1}^{m} \|x_{(i)} - \tilde{x}_{(i)}\|^2.$$

Therefore, from the point of view of the row space $A = PV^T$. The same can be done for the column space of A and get $A = UQ^T$, where U is also column-orthonormal, like V. It turns out that U and V have a special significance, which is formally stated as follows:

(Singular Value Decomposition)

Every matrix $A \in R^{m \times n}$ can be decomposed into $A = U \Sigma V^T$ where $U \in R^{m \times r}$, $V \in R^{n \times r}$, and $\Sigma \in R^{r \times r}$, with $r \leq \min(m,n)$ the rank of A. The columns $V_i$ of $V \equiv [v_1 \ldots v_r]$ are the right singular vectors of A and they form an orthonormal basis its row space. Similarly, the columns $u_i$ of $U \equiv [u_1 \ldots u_r]$ are the left singular vectors and form a basis of the column space of A. Finally, $\Sigma \equiv \text{diag}[\sigma_1 \ldots \sigma_r]$ is a diagonal matrix with positive values $\sigma_i$, called the singular values of A.

From the above, the matrix of projections P is $P = U\Sigma$. Next, the properties of a low-dimensional approximation can be formally stated using the first k singular values (and corresponding singular vectors) of A:

(Low-Rank Approximation)

If only the singular vectors corresponding to the k highest singular values (k<r), i.e.

if $\tilde{U} := [u_1 u_2 \ldots u_k]$, $\tilde{V} := [v_1 v_2 \ldots v_k]$ and $\tilde{\Sigma} = \text{diag}[\sigma_1 \sigma_2 \ldots \sigma_k]$ are kept, then $\tilde{A} = \tilde{U}\tilde{\Sigma}\tilde{V}^T$ is the best approximation of A, in the sense that it minimizes the error $$\|A - \tilde{A}\|_F^2 := \Sigma_{i,j=1}^{m,n} |a_{ij} - \tilde{a}_{ij}|^2 = \Sigma_{i=k+1}^{r} \sigma_i^2 \quad (EQ\ 2).$$

In equation (1), note the special significance of the singular values for representing the approximation's squared error. Furthermore, since U and V are orthonormal, $$\Sigma_{i=1}^{r} \sigma_i^2 = \|A\|_F^2 \text{ and } \Sigma_{i=1}^{k} \sigma_i^2 = \|\tilde{A}\|_F^2 \quad (EQ\ 3).$$

The following table, Table 1, references common notations that are used throughout this discussion.

TABLE 1

Frequently used notation.

| SYMBOL | DESCRIPTION |
| --- | --- |
| y | Vector $A \in R^n$ (lowercase bold), always column vectors. |
| A | Matrix $A \in R^{m \times n}$ (uppercase bold). |
| $a_j$ | j-th column of matrix A |
| $a_{(i)}$ | i-th row of matrix A, as a column vector. |
| $\|y\|$ | Euclidean norm of vector y. |
| $\|A\|_F$ | Frobenius norm of matrix A, $\|A\|_F^2 = \Sigma_{i,j=1}^{m,n} a_{i,j}^2$. |
| x | Time series matrix, with each row corresponding to a timestamp. |
| $X^{(w)}$ | The delay coordinates matrix corresponding to x, for window w. |
| $V^{(w)}$ | Right singular vectors of $X^{(w)}$. |
| $\Sigma^{(w)}$ | Singular values of $X^{(w)}$. |
| $U^{(w)}$ | Left singular vectors of $X^{(w)}$. |
| k | Dimension of approximating subspace. |
| $\tilde{V}^{(w)}$ | Same as $V^{(w)}, \Sigma^{(w)}, U^{(w)}$ |
| $\tilde{\Sigma}^{(w)}$ | but only with k highest singular |
| $\tilde{U}^{(w)}$ | values and vectors. |
| $\check{p}^{(w)}$ | Projection of $X^{(w)}$ onto the first $k$ right singular vectors, |

TABLE 1-continued

Frequently used notation.

| SYMBOL | DESCRIPTION |
|---|---|
| $\tilde{V}^{(w_0, l)}$ $\tilde{\Sigma}^{(w_0, l)}$ $\tilde{U}^{(w_0, l)}$ $\tilde{V}0^{(w_0, l)}$ | $\tilde{P}^{(w)} := \tilde{U}^{(w)} \tilde{\Sigma}^{(w)} = X^{(w)} \tilde{V}^{(w)}$. Hierarchical singular vectors, values and projections, for the $k$ highest singular values. Hierarchically estimated patterns (bases). |

Preliminaries
(Fixed-Window Optimal Patterns)

As discussed above, for a given a time series $x_t$, t=1, 2, ... and a window size w, the data stream analyzer 212 find the patterns that best summarize the series at this window size. The patterns, in one embodiment, are w-dimensional vectors $v_i \equiv [v_{i,1}, \ldots, v_{i,w}]^T \in R^w$ chosen so that they capture "most" of the information in the series. The process of choosing the patterns is discussed in greater detail below. However, in one embodiment, the right window size is not known a priori. Therefore, with respect to multi-scale pattern estimation the data analyzer 212 finds (i) the optimal patterns for each of these, and (ii) the best window w* to describe the key patterns in the series given a time series $x_t$ and a set of windows $W := \{w_1, w_2, w_3, \ldots\}$.

To find these patterns the concept of time-delay coordinates is introduced. For a time series $x_t$, t=1, 2, ... with m points seen so far, when looking for patterns of length w, the series are divided into consecutive, non-overlapping subsequences of length w. Thus, if the original series is a m×1 matrix (not necessarily materialized), it is substituted $$\frac{m}{w} \times w$$

matrix. Instead of m scalar values there is a sequence of m/w vectors with dimension w. Patterns are searched for among these time-delay vectors.

(Delay Coordinates)
Given a Sequence $x \equiv [x_1, x_2, \ldots, x_t, \ldots, x_m]^T$ and a delay (or window)$_w$, the delay coordinates are a$\lceil m/w \rceil \times w$ matrix with the t'-th row equal to $X_{(t')}^{(w)} := [x_{(t'-1)w+1}, x_{(t'-1)w+2}, \ldots, x_{t'w}]^T$.

It should be noted that neither X nor $X^{(w)}$ need to be fully materialized at any point in time. In one embodiment, the last row of $X^{(w)}$ is stored. Note that non-overlapping windows are chosen. However, overlapping windows can also be chosen, $X^{(w)}$ has m−w+1 rows, with row t comprising values $x_t$, $x_{t+1}, \ldots, x_{t+w}$. In this case, there are some subtle differences as is further described in (M. Ghil, M. Allen, M. Dettinger, K. Ide, D. Kondrashov, M. Mann, A. Robertson, A. Saunders, Y. Tian, F. Varadi, and P. Yiou. Advanced spectral methods for climatic time series. Rev. Geophys., 40(1), 2002), which is hereby incorporated by reference in its entirety. The subtle differences are akin to the differences between "standard" wavelets and maximum-overlap or redundant wavelets, which is further described in (D. B. Percival and A. T. Walden. Wavelet Methods for Time Series Analysis. Cambridge Univ. Press, 2000) and is hereby incorporated by reference in its entirety.

However, in one embodiment, non-overlapping windows are equally effective for pattern discovery and also lend themselves better to incremental, streaming estimation using limited resources. More generally, the original time series does not have to be scalar, but can also be vector-valued itself. The same process is performed, but only each row of $X^{(w)}$ is now a concatenation of rows of X (instead of a concatenation of scalar values). More precisely, the general time-delay coordinate matrix is constructed as follows:

The following is pseudo code for DELAY ($X \in R^{m \times n}$, w), which concatenates W consecutive rows of X (comprising of n numbers) into one row of $X^{(w)}$ (comprising of n×w numbers).

$m' \leftarrow \lfloor m/w \rfloor$ and $n' \leftarrow nw$

Output is $X^{(w)} \in R^{m' \times n'}$ {not necessarily materialized} for t=1 to m' do
   Row $X_{(t)}^{(w)}$ concatenation of rows
   $X_{((t-1)w+1)}, X_{((t-1)w+2)}, \ldots X_{(t,w)}$
end for (Incremental SVD)

Batch SVD algorithms are usually very costly. For an m×n matrix A, even finding only the highest singular value and corresponding singular vector needs time $O(n^2m)$, where n<m. Aside from computational cost, the SVD updated is incrementally updated as new rows are added to A. SVD update algorithms such as those described in (M. Brand. Fast online SVD revisions for lightweight recommender systems. In SDM, 2003 and S. Guha, D. Gunopulos, and N. Koudas. Correlating synchronous and asynchronous data streams. In KDD, 2003), which are hereby incorporated by reference in their entirety can support both row additions as well as deletions. However, besides the right singular vectors $v_i$, both of these approaches need to store the left singular vectors $u_i$ (whose size is proportional to the time series length).

An exemplary SVD update algorithm is shown below.

```
for i = 1 to k do
    Initialize v_i to unit vectors, v_i ← i_i
    Intitalize σ_i² to small positive value, σ_i² ← ε
end for
for all new rows a_(t+1) do
    Initialize ā ← a_(t+1)
    for i = 1 to k do
        y_i ← v_i^T ā {projection onto v_i}
        σ_i² ← σ_i² + y_i² {energy ∝ singular value}
        e_i ← ā − y_i v_i {error, e_i ⊥ v_i} v_i ← v_i + (1/σ_i²) y_i e_i {update singular vector estimate}

ā ← ā − y_i b_i {repeat with remainder of a_(t+1)}
    end for
    p_(t+1) ← V^T a_(t+1) {final low-dim. projection of a_(t+1)}
end for.
```

The above SVD update algorithm is only used as an example and in no way limits the present invention. The above algorithm does not need to store the left singular vectors. Because the data stream analyzer 212 finds patterns at multiple scales without an upper bound on the window size, an algorithm that does not need to store the left singular vectors is a suitable choice. However, the SVD update algorithm is not limited to an algorithm that does not need to store the left singular vectors. Furthermore, if more emphasis is needed to be placed on recent trends, an exponential forgetting scheme can be incorporated. For each new row, the algorithm updates k−n numbers. Therefore, in one embodiment, the total space requirements are O(nk) and the time per update is also O(nk). Finally, the incremental update algorithms, in one embodiment, need only the observed values and can therefore easily handle missing values by imputing them based on current estimates of the singular vectors.

Identifying Locally Optimal Patterns

Figure 4:
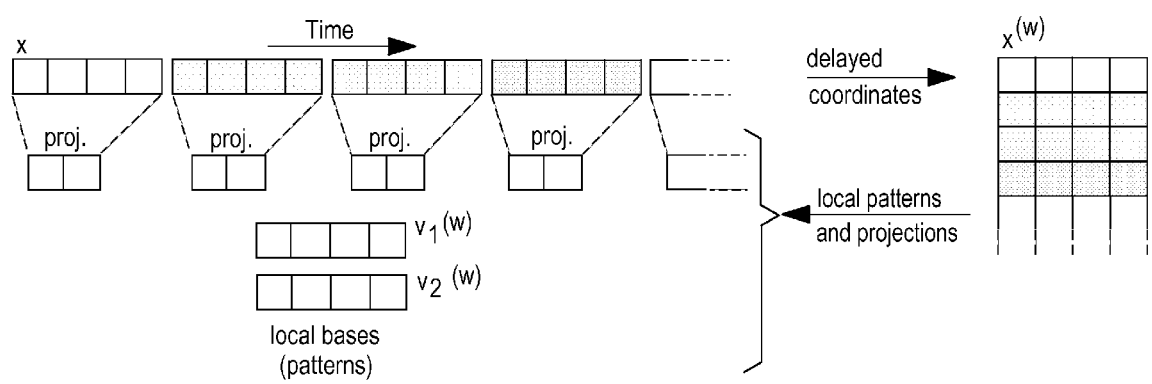
FIG. 4 illustrates local patterns for an exemplary fixed window.

FIG. 4 illustrates local patterns for a fixed window. In FIG. 4, the window length is w=4. It should be noted that the length w=4 is only for illustrative purposes. Starting with the original time series X in FIG. 4, $X^{(w)}$ is transferred to time-delay coordinates. The local patterns, in one embodiment, are the right singular vectors of $X^{(w)}$, which are optimal in the sense that they minimize the total squared approximation error of the rows $X_{(t)}^{(w)}$. An exemplar algorithm for identifying local patterns is given below.

Local Pattern ($x \in R^m$, w, k=3)
Use delay coord. $X^{(w)} \leftarrow$ DELAY(x, w)
Compute SVD of $X^{(w)} = U^{(w)} \Sigma^{(w)} V^{(w)}$
Local patterns are $v_1^{(w)}, \ldots, v_k^{(w)}$ Power is $\pi^{(w)} \leftarrow \Sigma_{i \geq k+1}^{w} \sigma_i^2 / w (\Sigma_{t=1}^{m} x_t^2 - \Sigma_{i=1}^{k} \sigma_i^2)/w$ $\tilde{P}^{(w)} \leftarrow \tilde{U}^{(w)} \tilde{\Sigma}^{(w)}$ {low-dim.proj.onto local patterns} return $\tilde{V}^{(w)}$, $\tilde{P}^{(w)}$, $\tilde{\Sigma}^{(w)}$ and $\pi^{(w)}$ The projections $\tilde{P}^{(w)}$ onto the local patterns $\tilde{v}^{(i)}$ are discussed in greater detail below. Note that the above algorithm for identifying local patterns can be applied in general to n-dimensional vector-valued series. The pseudocode is the same, since the DELAY algorithm discussed above can also operate on matrices $X \in R^{m \times n}$. In one embodiment, the first argument of LocalPattern may be a matrix, with one row $x_{(t)} \in R^n$ per timestamp t=1, 2, . . . , m.

In one embodiment, when computing the SVD, the highest k singular values and the corresponding singular vectors can be used because only $\tilde{V}^{(w)}$ and $\tilde{P}^{(w)}$ are returned. Therefore, the process of computing the full SVD can be avoided and more efficient algorithms, just for the quantities that are actually needed can be used. Also, note that $\tilde{\Sigma}^{(w)}$ can be computed from $\tilde{P}^{(w)}$, since by construction $\sigma_i^2 = \|p_i\|^2 = \Sigma_{j=1}^{m} p_{ji}^2$ (EQ 4). However, these are returned separately, which avoids duplicate computation. Furthermore, equation (3) does not hold exactly for the estimates returned by IncrementalSVD and, in one embodiment, it is better to use the estimates of the singular values $\sigma_i^2$ computed as part of IncrementalSVD.

In one embodiment, a default value of k=3 local patterns, although in another embodiment, an energy-based criteria to choose k can be chosen. It should be noted that the present invention is not limited to k=3, as k can be greater than 3 or less than 3. In one embodiment 3 or fewer patterns are sufficient because the first pattern captures the average trend (aperiodic if present) and the next two capture the main low-frequency and high frequency periodic trends. These trends are further described in (M. Ghil, M. Allen, M. Dettinger, K. Ide, D. Kondrashov, M. Mann, A. Robertson, A. Saunders, Y. Tian, F. Varadi, and P. Yiou. Advanced spectral methods for climatic time series. Rev. Geophys., 40(1), 2002), which is hereby incorporated by reference in its entirety. For a single window w, batch algorithms for computing the k highest singular values of a m×n matrix (n<m) are $O(kmn^2)$. Therefore, for window size w the time complexity is $$O\left(k \frac{t}{w} w^2\right) = O(ktw).$$

In one embodiment, to determine the local patterns for all windows up to $w_{max} = O(t)$, then the total complexity is $O(kt^3)$.

Figure 5:
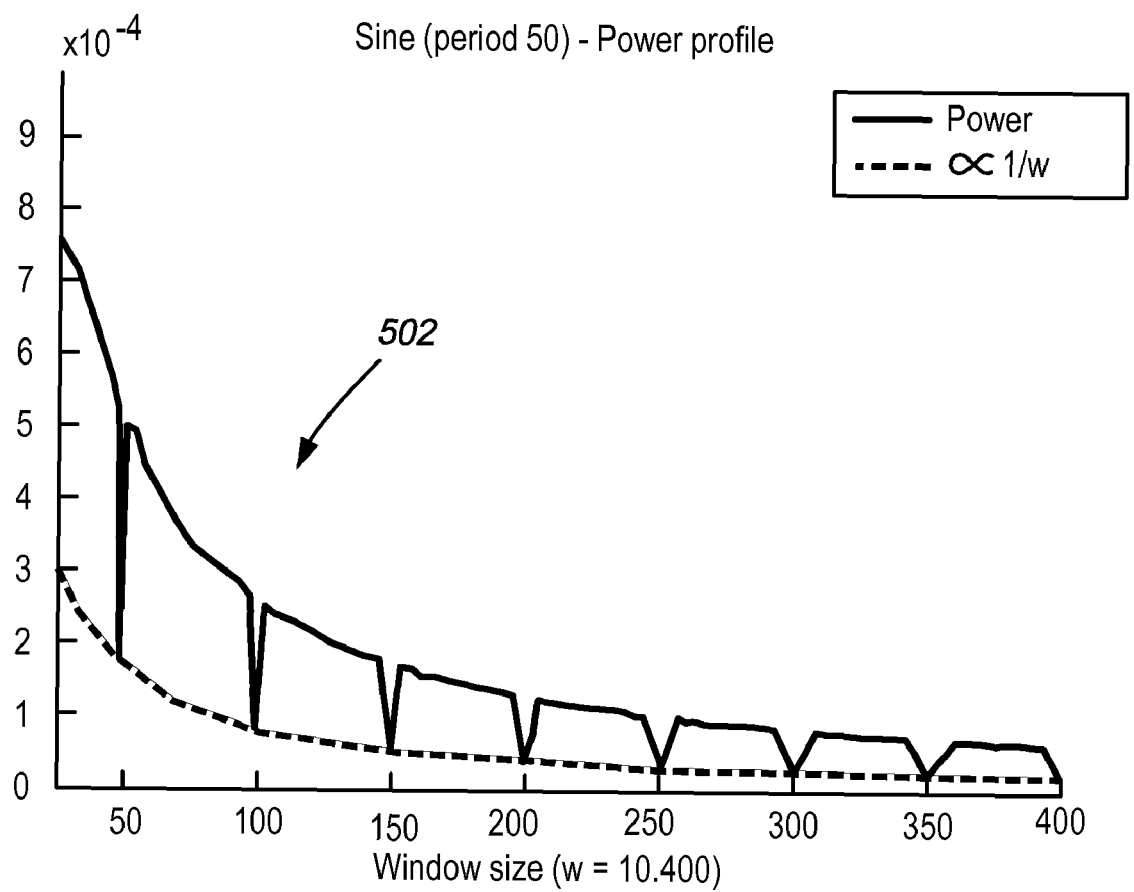
FIG. 5 is an exemplary graph illustrating a power profile a sine wave, according to an embodiment of the present invention.

Once optimal patterns for a number of different windows sizes have been determined, the data stream analyzer 212 determines which of these windows best describes the main trends. Intuitively, if there is a trend that repeats with a period of T, then different subsequences in the time-delay coordinate space should be highly correlated when w≈T. This is illustrated in FIG. 5, which shows a power profile 500 of sine wave $x_t = \sin(2\pi t/50) + \epsilon_t$, with Gaussian noise $\epsilon_t \sim N(5, 0.5)$. It should be noted the trends can be arbitrary and FIG. 5 shows a sine wave only as an example. The plot 502 in FIG. 5 shows the squared approximation error per window element, using k=1 pattern on a sine wave with period T=50. As expected, for window size w=T=50 the approximation error drops sharply and essentially corresponds to the Gaussian noise floor. For windows w=iT that are multiples of T, the error also drops. Also the error for all windows is proportional to $$\frac{1}{w},$$

since it is per window element. Eventually, for window size equal to the length of the entire time series w=m (not shown in FIG. 5, where m=2000), $\pi^{(m)} = 0$ since first pattern is the only singular vector, which coincides with the series itself. Therefore, the residual error is zero.

Formally, the squared approximation error of the time-delay matrix $X^{(w)}$ is $\epsilon^{(w)} := \Sigma_t \|\tilde{x}_{(t)}^{(w)} - x_{(t)}^{(w)}\|^2 = \|\tilde{X}^{(w)} - X^{(w)}\|_F^2$, where $\tilde{X}^{(w)} := \tilde{P}^{(w)} (\tilde{V}^{(w)})^T$ is the reconstruction, (see Equation 1). From Equations 2 and 3 $\epsilon^{(w)} = \|X^{(w)}\|_F^2 - \|\tilde{P}^{(w)}\|_F^2 \approx \|x\|^2 - \Sigma_{i=1}^{k} (\sigma_i^{(w)})^2$. Based on this, the power can be defined, which is an estimate the error per window element. The power profile $\pi^{(w)}$, in one embodiment ("POWER PROFILE") can be defined as follows: for a given number of patterns (k=2 or 3) and for any window size w, the power profile is the sequence defined by $$\pi^{(w)} := \frac{\epsilon^{(w)}}{w}. \qquad (EQ\ 5)$$

In other words, this is an estimate of the variance per dimension, assuming that the discarded dimensions correspond to isotropic Gaussian noise (i.e., uncorrelated with same variance in each dimension). The variance is lower when w=T, where T is the period of an arbitrary main trend.

The following lemma follows from the above observations. Note that the conclusion is valid both ways, i.e., perfect copies imply zero power and vice versa. Also, the conclusion holds regardless of alignment (i.e., the periodic part does not have to start at the beginning of a windowed subsequence). A change in alignment only affects the phase of the discovered local patterns, but not their shape or the reconstruction accuracy.

(Zero Power)

If $X \in R^t$ comprises of exact copies of a subsequence of length T then, for every number of patterns k=1, 2, . . . and at each multiple of T, $\pi^{(iT)} = 0$, i=1, 2, . . . , and vice versa. In general, if the trend does not comprise of exact copies, the power is not zero, but it still exhibits a sharp drop. This fact is used when choosing the "best" window.

Choosing The Window

The following are exemplary steps for interpreting the power profile to choose the appropriate window that best captures the main trends, according to one embodiment. The power profile $\pi^{(w)}$ versus w is determined. The first window $w_0^*$ that exhibits a sharp drop $\pi(w_0^*)$ is identified and all other drops occurring at windows $w \approx iw_0^*$, $i=2, 3, \ldots$ that are approximately multiples of $w_0^*$ are ignored. If there are several sharp drops at windows $w_i^*$ that are not multiples of each other, then any of these is suitable. In one embodiment, the smallest one is chosen. In another embodiment, the window $w_i^*$ is chosen based on prior knowledge about the domain if available. If no sharp drops exist, then no strong periodic/cyclic components are present. However, the local patterns at any window can still be examined to gain a picture of the time series behavior.

Multiple Scale Patterns

As discussed above, the data stream analyzer 212 determines the optimal local patterns for multiple windows (as well as the associated power profiles) in order to determine the optimal window size. The following discussion further discusses this process in more detail. In one embodiment, a geometric progression of window sizes is chosen. Rather than estimating the patterns for windows of length $w_0$, $w_0+1$, $w_0+2$, $w_0+3$, ..., the patterns, in one embodiment, are estimated for windows of $w_0$, $2w_0$, $4w_0$, ..., or more generally, for windows of length $w_l := w_0 \cdot W^l$ for $l=0, 1, 2, \ldots$. Thus, the size of the window set w needed to be examined is dramatically reduced. However, this is still computationally expensive (for each window O(ktw)time is still needed) and all points (needed for large window sizes, close to the time series length) are required to be buffered. However, this complexity can be reduced even further.

Figure 6:
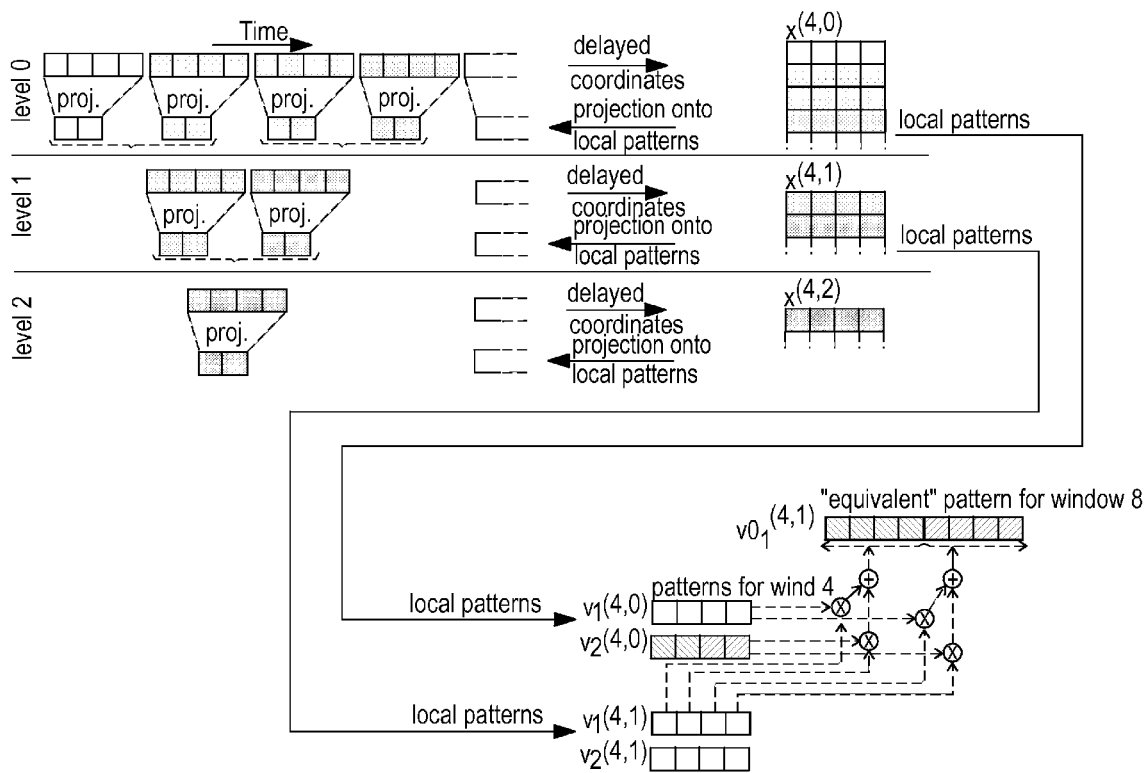
FIG. 6 illustrates multi-scale pattern discovery, according to an embodiment of the present invention.
Figure 7:
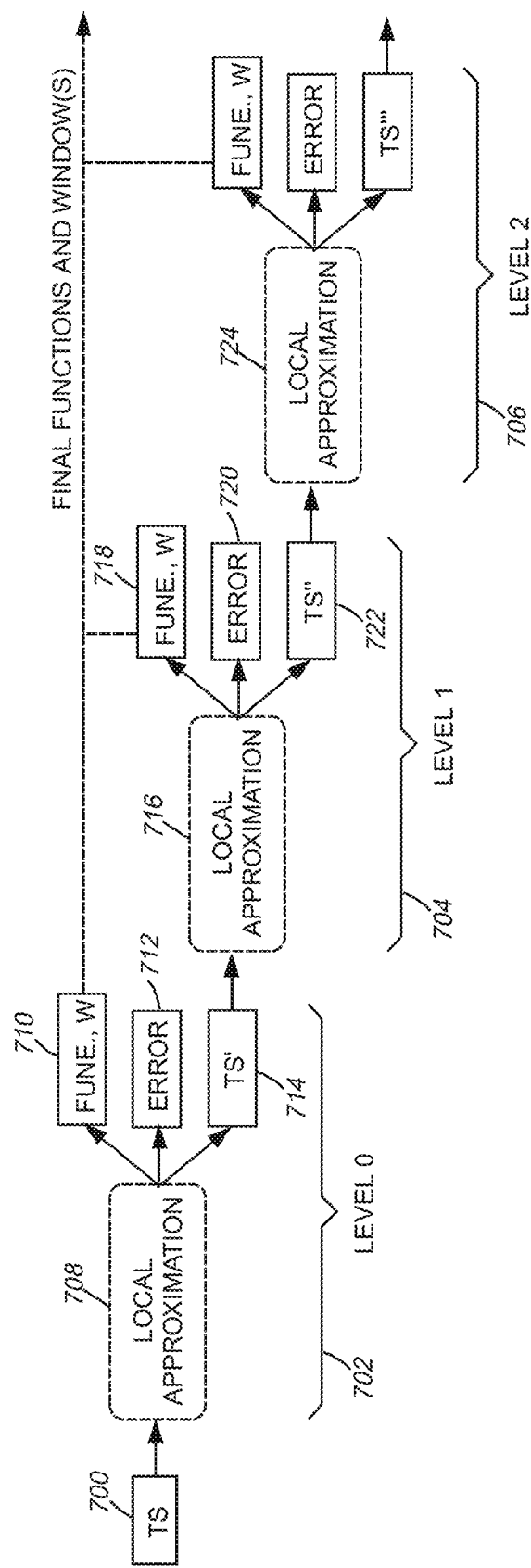
FIG. 7 is a simplified version of the multi-scale pattern discovery illustrated in FIG. 6.

For example, FIG. 6 shows a multi-scale pattern discovery (hierarchical, where $w_0=4$, $W=2$, $k=2$). FIG. 7 shows a more simplified version of the multi-scale pattern discovery of FIG. 6. As an example, let $k=2$ local patterns for a window size of $w_0=100$ and the patterns desired to be determined for window $w^{(100,1)}=100 \cdot 2^1=200$. The naïve approach is to construct $X^{(200)}$ from scratch and determine the SVD. However, the patterns found from $X^{(100)}$ can be reused. Using $k=2$ patterns $v_1^{(100)}$ and $v_2^{(100)}$, the first $w_0=100$ points $x_1, x_2, \ldots, x_{(100)}$ can be reduced into just two points, namely their projections $p_{1,1}^{(100)}$ and $p_{1,2}^{(100)}$ onto $v_1^{(100)}$ and $v_2^{(100)}$, respectively. Similarly, the next $w_0=100$ points $X_{101}, X_{102}, \ldots, X_{200}$ can also be reduced into two numbers $p_{2,1}^{(100)}$ and $p_{2,2}^{(100)}$ and so on. These projections, by construction, approximate the original series well. Therefore, the first row $x_{(1)}^{(200)} \equiv [x_1, \ldots, x_{200}]^T \in R^{200}$ of $X^{(200)}$ can be represented with just four numbers, $X_{(1)}^{(100,1)} \equiv [p_{1,1}^{(100)}, p_{1,2}^{(100)}, p_{2,1}^{(100)}, p_{2,2}^{(100)}]^T \in R^4$. Doing the same for the other rows of $X^{(200)}$, a matrix $X^{(100,1)}$ with just $n=4$ columns can be constructed. The local patterns are determined using $X^{(100,1)}$ instead of $X^{(200)}$. Repeating this process recursively allows for the local patterns for window $w^{(100,2)}=100 \cdot 2^2=400$ and so on to be determined.

As stated above, FIG. 7 shows a more simplified version of the process discussed above with respect to FIG. 6. FIG. 7 shows a data stream 700 that comprises a set of times series data. The time series is broken into a given number of hierarchical levels 702, 704, 706. One or more local approximations 708 are determined directly from the data in the first data stream 700. From the local approximations 706, approximating functions and a window size 710 and an approximation error 712 can be determined. The next hierarchical level 704, in one embodiment, can be passed the local approximation results such as the approximation functions and window size 710 from the previous level 702 for determining the local approximations for the next time series subset 714.

The local approximations 716 for the time series subset 714, in one embodiment, results in approximation functions and a window size(s) 718 and an approximation error 720. The approximation functions and window size(s) 718, in one embodiment, can be passed to the next level 706 for determining a local approximation(s) 724 for the next time series subset 722. This process can be continued for each time series subset.

(Level-($w_0$,l) Window)

The level-($w_0$,l) window, in one embodiment, corresponds to an original window size (or scale) $w_l := w_0 \cdot W^l$. Patterns at each level l are found recursively, using patterns from the previous level l−1. In the above example, $w_0=100$ and l=0, 1. Since $w_0$ and w are fixed for a particular sequence of scales $w_l$, only level-l windows and patterns, in one embodiment, need to be referred to. The recursive construction is based on the level-l delay matrix and corresponding patterns.

(Level-l Delay Matrix $X^{(w_0,l)}$)

Given a starting window $w_0$ and a scale factor w, the level-l delay matrix is simply $X^{(w_0,0)} := X^{(w_0)}$ for l=0 and for l=1, 2, ... is recursively defined by $X^{(w_0,l)} := _{DELAY}(\tilde{P}^{(w_0,l-1)}, W)$ where $\tilde{P}^{(w_0,l)} := X^{(w_0,l)} \tilde{V}^{(w_0,l)}$ is the projection onto the level-l patterns $\tilde{V}^{(w_0,l)}$ which are found based on $X^{(w_0,l)}$. The level-l delay matrix is an approximation of delay matrix $X^{(w_l)}$ for window size $w_l = w_0 W^l$. In the above example, the patterns extracted from $X^{(100,1)}$ are four-dimensional vectors $V_i^{(100,1)} \in R^4$, whereas the patterns for $X^{200}$ are 200-dimensional vectors $v_i^{(200)} \in R^{(200)}$. However, $V^{(100,1)}$ and $v_i^{(100,0)} \equiv v_i^{(100)}$ can be combined to estimate $v^{(200)}$.

(Level-l Local Pattern) $v0_i^{(w_0,l)}$

The level-l pattern $v0_i^{(w_0,l)}$, for all l=1, 2, ..., k, corresponding to a window of $w_l = w_0 W^l$ is simply $v0_i^{(w_0,0)} := v_i^{(w_0)}$ for l=0 and for l=1, 2, .... The level-l, in one embodiment, is defined recursively by $v0_i^{(w_0,l)}[(j-1)w_{l-1}+1:jw_l] := V0^{(w_0,l-1)}(v_i^{(w_0,l)}[(j-1)k+1:jk])$, (EQ 6) for j=1, 2, ..., w. It is an approximation of the local patterns $v_i^{(w_l)}$ of the original delay matrix $X^{(w_l)}$, for window size $w_1 = w_0 W^1$. Consider $v0_1^{(100,1)}$ the above example. The first $k=2$ out of $kW=4$ numbers in $V_1^{(100,1)}$ approximate the patterns among the 2-dimensional vectors $p_j^{(100,0)}$, which in turn capture patterns among the 100-dimensional vectors $x_i^{(100,0)}$ of the original time-delay matrix. Thus, but forming the appropriate linear combination of the 100-dimensional patterns $v_i^{(100,0)} \equiv v0_i^{(100,0)}$ (i.e., the columns of $\tilde{V}^{(100,0)} \equiv V0^{(100,0)}$), weighted according to $v_1^{(100,1)}[1:2]$, the first half of the 200-dimensional pattern $v0_1^{(100,1)}[1:100]$ can be constructed (left-slanted entries in FIG. 6).

Similarly, a linear combination of the columns $\tilde{V}^{(100,0)} \equiv V0^{(100,0)}$ weighted according to $v_1^{(100,1)}[3:4]$ gives the second half of the 200-dimensional pattern $v0_1^{(200,1)}[101:200]$ right slanted entries in FIG. 6). For level l=2 the columns of $V0^{(100,1)}$ are combined according to $v_1^{(100,2)}[1:2]$ (for the first half, $v0_1^{(100,2)}[1:200]$) and $v_1^{(100,2)}[3:4]$ (for the second half, $v0_1^{(100,2)}[201:400]$) and son on, for the higher levels.

Lemma 1 (Orthonormality of $v0_i^{(w_0,l)}$)

For $\|v0_i^{(w_0,l)}\|=1$ and, for $i \neq j$, $(v0_i^{(w_0,l)})^T(v0_j^{(w_0,l)})=0$, where i, j=1, 2, ..., k. PROOF, for level l=0 they are orthonormal since they coincide with the original patterns $v_i^{(w_0)}$ which are by construction orthonormal. The process proceeds by induction on the level of $l \geq 1$. Without loss of generality, assume that k=2 and, for brevity, let $B \equiv V0^{(w_0,l-1)}$ and $b_{i,1} \equiv v_i^{(w_0,l)}[1:k]$ so that $b_{i,2} \equiv v_i^{(w_0,l)}[k+1:k]$, $v_i^{(w_0,l)} = [b_{i,1}, b_{i,2}]$ Then $$\|v0_i^{(w_0,1)}\|^2 = [Bb_{i,1} Bb_{i,2}]^2$$
$$= \|Bb_{i,1}\|^2 + \|Bb_{i,2}\|^2$$
$$= \|b_{i,1}\|^2 + \|b_{i,2}\|^2$$
$$= \|v_i^{(w_0,1)}\|^2$$
$$= 1,$$

and $$(v0_i^{(w_0,1)})^T (v0_j^{(w_0,1)}) = [Bb_{i,1} Bb_{i,2}]^T [Bb_{j,1} Bb_{j,2}]$$
$$= b_{i,1}^T B^T Bb_{j,1} + b_{i,2}^T B^T Bb_{j,2}$$
$$= b_{i,1}^T b_{j,1} + b_{i,2}^T b_{j,2}$$
$$= (v_i^{(w_0,1)})^T (v_j^{(w_0,1)})$$
$$= 0,$$

since B preserves dot products as an orthonormal matrix (by inductive hypothesis) and $v_i^{(w_0,1)}$ are orthonormal by construction. In one embodiment, the maximum level L is determined based on the length m of the time series so far, $L \approx \log_W (m/w_0)$.

The detailed hierarchical SVD algorithm is shown below:

```
(HIERARCHICAL ( x ∈ R^m, w_0, W, L, k = 6))
{Start with level l = 0, corresponding to window w_0}
Ṽ^(w_0,0), P̃^(w_0,0), Σ̃^(w_0,0), π^(w_0,0) ←
        LOCALPATTERN(x, w_0, k)
{Levels l, corresponding to wondow w_l = w_0 · W^l }
for level l = 1 to L do
    Ṽ^(w_0,l), P̃^(w_0,l), Σ̃^(w_0,l), π^(w_0,l) ←
        LOCALPATTERN(P̃^(w_0,l-1), W, k)
    Compute patterns v 0_i^(w_0,l) for window size w_l are based
        on Equation (6)
end for
```

Choosing the Initial Window

The initial window $w_o$ has some impact on the quality of the approximations. This also depends on the relationship of k to $w_0$ (the larger k is, the better the approximation and if $k = w_0$ then $\tilde{P}^{w_0,1} = X^{(w_0)}$ i.e., no information is discarded at the first level). However, in one embodiment k is desired to be relatively small since it determines the buffering requirements of the streaming approach. Hence, in one embodiment, k=6. However, the present invention is not limited to k=6 and, in one embodiment, an energy-based thresholding, which can be done incrementally, can be chosen.

If $w_0$ is too small, then too much of the variance is discarded too early. If $w_0$ is unnecessarily big, this increases buffering requirements and the benefits of the hierarchical approach diminish. In one embodiment, a good compromise is a value in the range $10 \leq w_0 \leq 20$. Finally, out of the six patterns that are kept per level, the first two or three are of interest and reported to the user. The remaining are kept to ensure that $X^{(w_0,l)}$ is a good approximation of $X^{(w_l)}$.

Choosing the Scales

As discussed above, if there is a sharp drop of $\pi^{(T)}$ at window w=T, then drops at multiples w=iT, i=2, 3, . . . are also observed. Therefore, in one embodiment, a few different starting windows $w_0$ and scale factors W that are relatively prime to each other are chosen. In one example, the following three choices are sufficient to quickly zero in on the best windows and the associated optimal local patterns: k=6 and $(w_0, W) \in \{(9,2), (10,2), (15,3)\}$.

Complexity

For a total of $L \approx \log_W(t/w_0) = O(\log t)$ the first k singular values and vectors of $X^{(w_0,l)} \in R^{t/(w_0 W^l) \times Wk}$ are determined, for l=1, 2, . . . . A batch SVD algorithm requires time $$O(k \cdot Wk)^2 \cdot \frac{t}{w_0 W^l},$$

which is $$O\left( \frac{W^2 k^2 t}{W^l} \right)$$

since $k < w_0$. Summing over l=1, . . . , L, $O(W^2 k^2 t)$ is obtained Finally, for l=0, $$O\left( k \cdot w_0^2 \frac{t}{w_0} \right) = O(k w_0 t)$$

is needed. Thus, the total complexity is $O(W^2 k^2 t + {}^{kw}{}_0 t)$. Since W and $w_0$ are fixed, the following is true:

Lemma 2 (Batch Hierarchical Complexity)

The total time for the hierarchical approach is $O(k^2 t)$, i.e., linear with respect to the time series length. Even though this is an improvement over the $O(t^3 k)$ time of the non-hierarchical approach, all of the points, in one embodiment, are buffered, as is discussed below.

Streaming Computation

As stated above, the data stream analyzer 212 performs a hierarchical, recursive summarization or approximation of the stream that examines the time series at multiple time scales (i.e., window sizes) and efficiently discovers the key patterns in each, as well as the key windows. In this section, the procedure for examining the time series at multiple scales is discussed. In one embodiment, only one iteration of each loop in IncrementalSVD (for LocalPattern) and in Hierarchical is recursively invoked, as soon as the necessary number of points has arrived. Subsequently, these points are discarded and proceed with the next non-overlapping window.

Modifying Local Pattern

In one embodiment, consecutive points of x (or, in general, rows of x) are buffered until w of them are accumulated thereby forming one row of $X^{(w)}$. At that point, one iteration of the outer loop in Incremental SVD is performed to update all k local patterns. Then, the W points (or rows) are discarded and proceed with the next w. Also, since on higher levels the number of points for SVD may be small and close to k, the first k rows of $X^{(w)}$ can be chosen to be initially buffered and used to bootstrap the SVD estimates, which are subsequently updated.

Modifying Hierarchical

For level l=0 the modified LocalPattern is used on the original series, as above. However, the k projections are stored onto the level-0 patterns. W consecutive sets of these projections are buffered and as soon as kW values accumulate, the k local patterns for level l=1 are updated. Then the kW projections from level-0 are discarded, but the k level-1 projections are kept. The same process is performed for all other levels l=2.

Complexity
Compared to the batch computation, $$O\left(k \cdot Wk \cdot \frac{t}{w_0 W^l}\right) = O\left(w\frac{kt}{w^{l-1}}\right)$$

time is needed to compute the first k singular values and vectors of $X^{(w_0, l)}$ for l=1, 2, . . . . For $$l=0 \; O\left(k \cdot w_0 \cdot \frac{t}{w_0}\right)$$

time is needed. Summing over l=0, 1, . . . , LO(kt) is obtained. With respect to space, $w_0$ points are buffered for l=0 and Wk points for each of the remaining L=O(log t) levels, for a total of O(k log t). Therefore, the following is true:

Lemma 3 (Streaming, Hierarchical Complexity)

Amortized cost is O(k) per incoming point and total space is O(k log t). Since k=6, the update time is constant per incoming point and the space requirements grow logarithmically with respect to the size t of the series. Table 2 below summarizes the time and space complexity for each approach.

|  | Time | | Space | |
| --- | --- | --- | --- | --- |
|  | Non-hier. | Hier. | Non-hier. | Hier |
| Batch | $O(t^3 k)$ | $O(tk^2)$ | all | all |
| Incremental | $O(t^2 k)$ | $O(tk)$ | $O(t)$ | $O(k \log t)$ |

Figure 8:
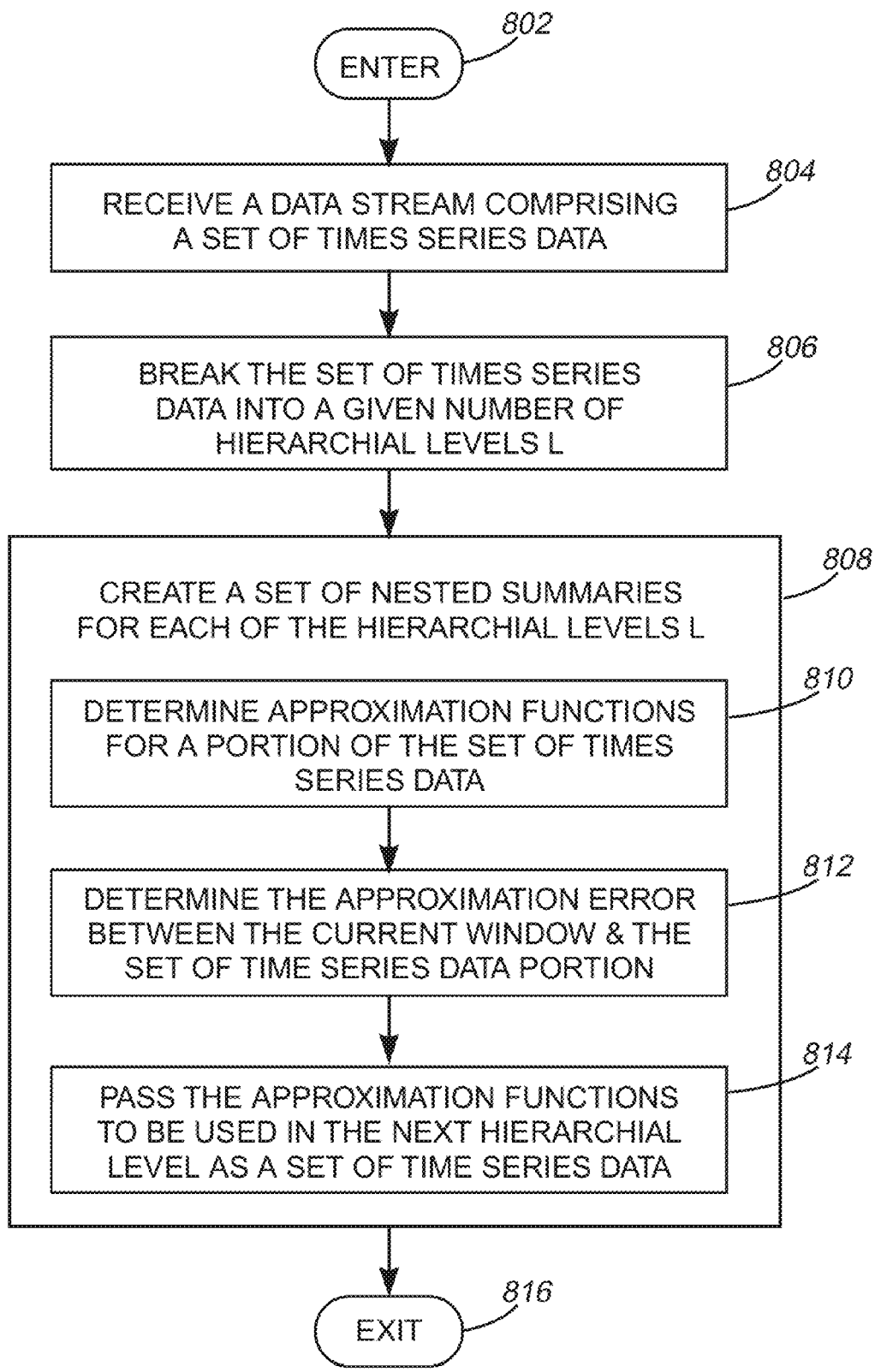
FIG. 8 an operational flow diagram illustrating an exemplary process of identifying local patterns in one or more time series data streams, according to an embodiment of the present invention.

Exemplary Process for Identifying Local Patterns in at Least One Time Series Data Stream FIG. 8 shows an exemplary process of identifying local patterns in one or more time series data streams. The operational flow diagram of FIG. 8 begins at step 802 and flows directly to step 804. The information processing system 102, at step 804, receives a data stream comprising a set of time series data. The data stream analyzer 212, at step 806, breaks the set of time series data into a given number of hierarchical levels l. The data stream analyzer 212, at step 808 creates a set of nested summaries for each of the hierarchical level l.

The creation of the nested summaries comprises the following. The data stream analyzer 212, at step 810, determines the approximation function(s) for a portion of the set of time series data directly from the time series data. The data stream analyzer 212, at step 812, determines the approximation error between the current window and the set of time series data portion. The data stream analyzer 212, at step 814, passes the approximation function(s) determined at step 810 to the next hierarchical level as a set of time series data. The control flow then exits at step 814.

Non-Limiting Examples

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer-implemented method for identifying local patterns in at least one time series data stream, the method comprising:
    generating multiple ordered levels of hierarchical approximation functions directly from at least one given time series data stream including at least one set of time series data, wherein the hierarchical approximation functions for each level of the multiple ordered levels is based upon
    creating a set of approximating functions;
    selecting a current window with a current window length from a set of varying window lengths, wherein the current window is selected for a current level of the multiple ordered levels;
    wherein generating multiple ordered levels of hierarchical approximation functions includes generating multiple increasing consecutive numerically ordered levels,
    wherein the current window is a portion of the set of time series data divided into consecutive sub-sequences, and wherein the current window length along with the hierarchical approximating functions reduces an approximation error between the current window and the set of time series data portion,
    calculating the approximation error between the current window and the set of time series data portion;
    basing the current window length on the approximation error calculated between the current window and the set of time series data portion;
    wherein the time series data stream is divided into non-overlapping consecutive subsequences,
    wherein the current window length for the current window is larger than a current window length for a previous window in the multiple ordered levels of hierarchical approximation functions, wherein the hierarchical approximation functions for each of level of the multiple ordered levels is further based upon creating a set of coefficients that summarize the set of time series data portion in the current window;

reusing the set of approximating functions from the previous window; and reducing a power profile $\pi^{(w)}$ defined by a total squared error, via principal component analysis, wherein the total squared error is given by equation $$\Sigma_{i=k+1}^{w} \sigma_i^2 w = (\Sigma_{t=1}^{m} x_t^2 - \Sigma_{i=1}^{k} \sigma_i^2)/w$$

wherein k is an number of patterns chosen $\{1 \ldots k\}$, wherein the patterns are vectors equal to a window length w, where m is a multiple of the window size and wherein $x_t$ is the set of time series data portion, and wherein $\sigma$ is a singular value for a given index I; and using a subspace tracking algorithm to approximate incrementally all of the following quantities:

the window length w, singular values of a matrix $\sigma$, local patterns for window length w, local approximations for each window of length w, and k;

storing the multiple ordered levels of hierarchical approximation functions into memory after being generated.

2. A computer-implemented method for identifying local patterns in at least one time series data stream, the method comprising:

receiving a data stream comprising at least one set of time series data;

forming the at least one set of time series data into a set of multiple ordered levels of time series data; and generating multiple ordered levels of hierarchical approximation functions directly from the multiple ordered levels of time series data, wherein the hierarchical approximation functions for each level of the multiple ordered levels is based upon creating a set of approximating functions for each level in the multiple ordered levels;

selecting a current window with a current window length from a set of varying window lengths, wherein the current window is selected for a current level of the multiple ordered levels;

passing the set of approximating functions created at one level in the multiple ordered levels to a subsequent level in the multiple ordered levels as a set of time series data; and storing the multiple ordered levels of hierarchical approximation functions into memory after being generated, wherein the hierarchical approximation functions for each of level of the multiple levels is based reducing a total squared reconstruction error, via principal component analysis.

3. The method of claim 2, wherein the generating multiple levels of hierarchical approximation functions includes generating multiple increasing consecutive numerically ordered levels.

4. The method of claim 2, wherein the current window is a portion of the set of time series data divided into consecutive sub-sequences, and wherein the current window length along with the hierarchical approximating functions reduces an approximation error between the current window and the set of time series data portion.

5. The method of claim 2, wherein the current window length for the current window is larger than a current window length for a previous window in the multiple levels of hierarchical approximation functions.

6. The method of claim 2, wherein the time series data stream is divided into non-overlapping consecutive subsequences.

7. The method of claim 2, wherein the hierarchical approximation functions for each of level of the multiple levels is based upon further creating a set of coefficients that summarize the set of time series data portion in the current window.

8. The method of claim 2, wherein the hierarchical approximation functions for each level of the multiple levels is based upon reusing the set of approximating functions from a previous window.

9. The method of claim 8, wherein total squared reconstruction error is given by equation $$\Sigma_{i=k+1}^{w} \sigma_i^2/w = (\Sigma_{t=1}^{m} x_t^2 - \Sigma_{i=1}^{k} \sigma_i^2)/w$$

wherein k is an number of patterns chosen $\{1 \ldots k\}$, wherein the patterns are vectors equal to a window length w, where m is a multiple of the window size and wherein $x_t$ is the set of time series data portion, and wherein $\sigma$ is a singular value for a given index i.

10. The method of claim 9, further comprising using a subspace tracking algorithm to approximate incrementally at least one the following quantities the window length w, singular values of a matrix $\sigma$, local patterns for window length w, local approximations for each window of length w, and k.

11. The method of claim 5, further comprising:

calculating the approximation error between the current window and the set of time series data portion; and basing the current window length thereon.

12. A system for identifying local patterns in at least one time series data stream, the system comprising:

at least one information processing system, wherein the information processing system includes:

a memory; and a data stream analyzer communicatively coupled to the memory, wherein the data stream analyzer:

receives a data stream comprising at least one set of time series data;

forms the at least one set of time series data into a set of multiple ordered levels of time series data; and generates multiple ordered levels of hierarchical approximation functions directly from the multiple ordered levels of time series data, wherein the generation of multiple levels of hierarchical approximation functions includes generating multiple increasing consecutive numerically ordered levels, and wherein the hierarchical approximation functions for each level of the multiple ordered levels is based upon creating a set of approximating functions for each level in the multiple ordered levels;

selecting a current window with a current window length from a set of varying window lengths, wherein the current window is selected for a current level of the multiple ordered levels;

passing the set of approximating functions created at one level in the multiple ordered levels to a subsequent level in the multiple ordered levels as a set of time series data; and storing the multiple ordered levels of hierarchical approximation functions into memory after being generated, wherein the hierarchical approximation functions for each of level of the multiple levels is based reducing a total squared reconstruction error, via principal component analysis.

13. The system of claim 12, wherein the current window is a portion of the set of time series data divided into consecutive sub-sequences, and wherein the current window length along with the hierarchical approximating functions reduces an approximation error between the current window and the set of time series data portion.

14. The system of claim 12, wherein the hierarchical approximation functions for each level of the multiple levels is based upon at least one of:
   further creating a set of coefficients that summarize the set of time series data portion in the current window; and
   reusing the set of approximating functions from a previous window.

15. The system of claim 12, further comprising:
   calculating an approximation error between the current window and the set of time series data portion; and
   basing the current window length thereon.

16. A computer readable storage medium with computer readable instructions which when executed causes a computer to carry out the steps of a method:
   receiving a data stream comprising at least one set of time series data;
   forming the at least one set of time series data into a set of multiple ordered levels of time series data; and
   generating multiple ordered levels of hierarchical approximation functions directly from the multiple ordered levels of time series data, the multiple ordered levels of hierarchical approximation functions being ordered with respect to each other, and wherein the hierarchical approximation functions for each level of the multiple ordered levels is based upon
      creating a set of approximating functions for each level in the multiple ordered levels;
      selecting a current window with a current window length from a set of varying window lengths, wherein the current window is selected for a current level of the multiple ordered levels;
      passing the set of approximating functions created at one level in the multiple ordered levels to a subsequent level in the multiple ordered levels as a set of time series data; and
   storing the multiple ordered levels of hierarchical approximation functions into memory after being generated, wherein the hierarchical approximation functions for each of level of the multiple levels is based reducing a total squared reconstruction error, via principal component analysis.

17. The computer readable article of claim 16, wherein the generating multiple levels of hierarchical approximation functions includes generating multiple increasing consecutive numerically ordered levels.

18. The computer readable article of claim 16, wherein the current window is a portion of the set of time series data divided into consecutive sub-sequences, and wherein the current window length along with the hierarchical approximating functions reduces an approximation error between the current window and the set of time series data portion.

* * * * *